UNITED STATES PATENT OFFICE.

C. COLGATE, OF LANCASTER, OHIO.

IMPROVEMENT IN THE MANUFACTURE OF FLOUR.

Specification forming part of Letters Patent No. 38,033, dated March 31, 1863.

*To all whom it may concern:*

Be it known that I, CHARLES COLGATE, of the city of Lancaster, in the county of Fairfield and State of Ohio, have invented a new and improved mode of manufacturing flour by the admixture of kiln-dried Indian-corn starch with wheat before grinding; and I do hereby declare that the following is a full and exact description thereof.

The nature of my invention consists in the admixture of the kiln-dried starch with the wheat before grinding, thereby incorporating it more thoroughly and effectually with the flour, substantially as and for the purposes hereinafter set forth.

The proportions of wheat and starch used may be varied according to the quality of the wheat and the purposes for which the flour may be prepared; but with good wheat and for all general purposes the proportions of twenty pounds of the starch to sixty pounds of wheat I have found to be most suitable. The starch in its merchantable shape is mixed with the wheat with sufficient care and uniformity to produce the requisite uniformity and homogeneousness of flour; but much less care and labor are evidently required to insure this than would be necessary to mix the ground starch directly with the flour, so that in this mode of uniting in this respect alone consists one of the advantages of my invention. The whole mixture is then ground and bolted in the mill, as usual, and no further care nor particularity of treatment is required to prepare the improved flour for market.

The superiority and advantages of flour thus prepared I have found to be important. The starch being thus so intimately combined with the wheat-flour by this superior mechanical process of mixture affords such a shield to the gluten and albuminous constituents of the wheat that flour thus prepared becomes protected against fermentation, and consequently has preservative qualities not to be obtained in simple wheat-flour, thereby rendering this improved flour peculiarly valuable for long sea-voyages and for shipping to hot climates. The extreme dryness of the kiln-dried starch also greatly reduces the proportionate moisture of the whole flour, tending, therefore, to the same preservative result. The flour also produces whiter bread and pastry—a quality which commends it to housekeepers. Besides, wheat which has partially germinated before grinding, as often happens, and which, from the conversion of a portion of its starch into sugar thereby, would otherwise make clammy bread, by the admixture of starch, as above described, will produce a flour free from that injurious quality.

With the above advantages of my improvement the nutritive qualities of the flour are only varied in proportion, increasing the starch, which is the principal nutritive constituent of wheat-flour, and which is necessary to the human system in due quantity, as is the gluten, which is relatively diminished thereby. For the more farinaceous dishes it is superior to simple wheat-flour.

I disclaim the mere adding of starch to flour for immediate culinary purposes, as sometimes practiced by bakers and others, such a use of starch not effecting the principal purposes of my invention; but

What I claim as my invention, and desire to secure by Letters Patent, is—

The admixture of kiln-dried starch with wheat, to be ground therewith, in the manufacture of flour, substantially as and for the purposes herein specified.

CHAS. COLGATE.

Witnesses:
 JAS. A. BOPE,
 ALFRED McVEIGH.